United States Patent [19]
Faville et al.

[11] Patent Number: 4,749,930
[45] Date of Patent: Jun. 7, 1988

[54] HIGH SPEED POSITIVE FEED DRILL MOTOR OPEN LOOP CONTROL SYSTEM

[75] Inventors: Paul E. Faville, Renton, Wash.; James D. Tuttle, Houston, Tex.

[73] Assignee: The Boeing Company, Seattle, Wash.

[21] Appl. No.: 921,726

[22] Filed: Oct. 22, 1986

[51] Int. Cl.$^4$ .............................................. H02P 8/00
[52] U.S. Cl. .................................... 318/696; 318/685; 415/503
[58] Field of Search ................. 318/696, 685; 415/503

[56] References Cited

U.S. PATENT DOCUMENTS

3,446,099  5/1969  Lesher et al. .......................... 408/10
3,677,351  7/1972  Geissler ............................ 415/503 X
4,566,849  1/1986  Flink ................................... 415/92

Primary Examiner—William M. Shoop, Jr.
Assistant Examiner—Saul M. Bergmann
Attorney, Agent, or Firm—Conrad O. Gardner; B. A. Donahue

[57] ABSTRACT

A high speed positive feed drill motor open loop control system. The motor system comprises a minimally limited inertia air turbine motor including mounting guidance and control for enabling the drill to advance into the workpiece at a rate exactly proportional to the rotational speed of the drill. The turbine speed is measured with a digital tachometer while a stepper motor/ball screw mechanism is utilized to control and apply the feed rate.

2 Claims, 9 Drawing Sheets

- ⟨18⟩ SPINDLE DI-MAG PICKUP INPUT (TTL)
- ⟨9⟩ STEPPER MOTOR ENCODER INPUT (TTL)
- ⟨28⟩ RAMP CONTROL FLIP-FLOP
- ⟨26⟩ ENCODER COUNTER ZERO PULSE
- ⟨17⟩ ENCODER COUNTER ZERO LATCH
- ⟨29⟩ RAMP GENERATOR FOUT = FMIN. PULSE
- ⟨30⟩ DITHER OSCILLATOR LATCH
- ⟨23⟩ STEPPER MOTOR DRIVE PULSES
- ⟨8⟩ DRILL HOME SIGNAL
- ⟨5⟩ CW FEED DIRECTION INDICATOR (LED)
- ⟨10⟩ STEPPER MOTOR ENCODER OUTPUT (TTL)

- ⟨32⟩ CW DIRECTION STEPPER DRIVE PULSES
- ⟨3⟩ VCC (+5 VOLTS DC)

- ⟨31⟩ CCW DIRECTION STEPPER DRIVE PULSES
- ⟨6⟩ CCW FEED DIRECTION INDICATOR (LED)

- ⟨4⟩ DRILL HOME POSITION INDICATOR (LED)
- ⟨22⟩ DIVIDED SPINDLE PULSES (FEED RATE PULSES)
- ⟨7⟩ MANUAL RESET SWITCH
- ⟨2⟩ VDD (+12 VOLTS DC)

- ⟨1⟩ COMMON
- ⟨21⟩ DRILL EXTEND START PULSE (CW DIRECTION)
- ⟨25⟩ DITHER (PARK) SWITCH INPUT
- ⟨24⟩ DRILL RETRACT START PULSE (CCW DIRECTION)
- ⟨19⟩ DRILL EXTEND START PULSE INPUT
- ⟨20⟩ DRILL RETRACT PULSE INPUT
- ⟨27⟩ LOST LOCK OR SLOW SPINDLE RETRACT PULSE

- |26> COUNTER ZERO
- |28> RAMP CONTROL OUT
- |21> EXTENDED PULSE
- |32> INITIALIZE SWITCH
- |2> V_DD (+12 VDC)
- |1> COMMON

- |24> RETRACT LATCH
- |5> RAMP LED
- |30> DITHER LATCH

- |23> PULSE OUT

- |6> RUN LED

- |29> CW-CCW FLIP FLOP
- |17> COUNTER ZERO LATCH
- |10> ENCODER INPUT

- |18> SPINDLE PULSE (UNDIVIDED)
- |22> SPINDLE PULSE (DIVIDED)
- |27> UNLOCK OR SLOW SPINDLE RETRACT
- |11> LOCK LED
- |3> V_CC (5V)

*Fig. 5C*

HIGH SPEED POSITIVE FEED DRILL MOTOR OPEN LOOP CONTROL SYSTEM

BACKGROUND OF THE INVENTION

The present invention relates to high speed drilling apparatus and, more particularly, to such an apparatus and method for advancing a drill into the workpiece at a rate exactly proportional to the drill rotational speed.

Heretofore the patent literature has included systems such as shown in U.S. Pat. No. 3,446,099 utilizing open loop control for positive feed drilling. Also the prior art literature is illustrative of air turbine drives for cutting tools such as shown in U.S. Pat. No. 2,433,874.

The referenced U.S. Pat. No. 3,446,099 titled "Adaptive Control For A Machine Tool" can be contrasted to the present system which is utilized to drill holes very rapidly and up to ten diameters deep in aluminum while minimizing the energy required and mass of equipment. The present control system positively feeds the drill to optimize chip formation and removal and better control host machine tool loading due to drill thrust loads. Drills are operated at 10 to 20% of breaking torque.

The prior art U.S. Pat. No. 3,446,099 system purports to control the torque on small diameter drills in hard materials below the breaking torque by maintaining a constant feed rate and varying rpm to achieve torque control. Flute packing is sensed through a torque sensor and the drill withdrawn to clear chips thereby permitting drilling to a 150 diameter depth. Spindle inertia in the referenced U.S. Pat. No. 3,446,099 system is held to a minimum to allow timely rpm variation to achieve the purported torque control. In contrast, the effective spindle inertia of the present system is much greater than the minimum and is critical to the operation of the present system. In order to drill aircraft quality fastener holes in aluminum material of the sizes presently desired and at the rate presently desired, 18 plus horsepower would be required. In accordance with the present system such holes require approximately 5 horsepower due to the storage of mechanical energy in the rotating spindle system, primarily in the flywheel like turbine disc. Time between holes found in the drilling operation is utilized in the present system to store up the energy required.

In accordance with a preferred embodiment of the present invention mechanical energy storage provides the following advantages:

1. Smaller and lighter equipment is required than would be necessary with a constant output power source.
2. The present system utilizes less energy than a constant output power source.

Mechanical energy storage as outlined above is especially useful in drilling operations due to the discontinuous nature of drilling as a machining operation. The U.S. Pat. No. 3,446,099 "Adaptive Control For A Machine Tool" utilizes a spindle system wherein spindle inertia is held to a minimum to allow rapid acceleration and deceleration of the drill and makes no attempt at mechanical energy storage—precisely the opposite of what is desired in accordance with the teachings of the present system.

The input horsepower required of the present system is a function of the total time allowed for the drilling cycle, including time between holes, rather than that required of the drill purely during the time of cutting as in the prior art U.S. Pat. No. 3,446,099 system.

The aforementioned U.S. Pat. No. 3,446,099 system is continuously coupled, the spindle to the feed, or completely cut off through a switch. This means the stepper motor or motors used in the feed system drive is or are required to start and stop within one step to remain in the positive feed desired. Therefore the stepper motor is running in its base speed range. Accordingly, increased speed is attained by coupling two stepper motors to a different gear train and alternatively feeding each thereby effectively doubling the speed capability.

In contrast the present system utilizes a spindle which is kept constantly turning at a high energy rotational rate. The feed system remains stationary until actuation, whereon the ramp generator delivers, at rapidly and linearly increasing frequency, a pulse train to the stepper, accelerating it to approximately ten times the base speed. When the frequency of the pulse train from the ramp generator is equal to the frequency of the pulse train from the spindle source, i.e. synchronism, the present circuit switches from delivering pulses from the ramp generator to the stepper motor to delivering pulses from the spindle source to the stepper motor, placing the stepper motor under direct spindle control and thereby achieving positive feed.

The present system could not function without the aforementioned ramping and switching since the required motor speed is in the slewing speed range of stepper motor operation. Accordingly the present system could not function through simply an on/off switching arrangement as done in the prior art U.S. Pat. No. 3,446,099 system.

During the time the stepper motor is under control by the spindle pulse train, the ramp oscillator frequency is caused to oscillate up and down rapidly and thus held very close to the spindle frequency by causing the ramp frequency to increase when below the spindle frequency and decrease when above the spindle frequency. Were the ramp frequency not so controlled, it would always go to some maximum frequency which could be much higher than the spindle frequency. In such a case there would be a finite time delay from the time the ramp down or drill retract signal was received and the time when the ramp generator decreased in frequency sufficiently to reassume control of the stepper motor from the spindle pulse train, i.e. until synchronism. This would cause unacceptable drill feed overtravel.

As the U.S. Pat. No. 3,446,099 system operates in the much lower base speed range of stepper motor operation, no such ramp generator or ramp generator control is required. As the present system operates at approximately ten times base speed, were a simple switching on/off system used as in the U.S. Pat. No. 3,446,099 system, approximately ten stepper motors coupled through differential gear trains would be required to achieve the feed rate currently desired.

The prior art U.S. Pat. No. 3,446,099 system incoporates a torque sensor on the spindle whereas none is used in the present system. In the U.S. Pat. No. 3,446,099 system this feature is used to control drill torque whereas the present system does not attempt to control by torque required of the drill.

In accordance with a preferred embodiment of the present invention a conventional drill is rotated by a minimally limited inertia air turbine motor. The drill and the turbine motor are moved back and forth (moving the drill into and out of the workpiece) on a precision linear travel feed carriage. The carriage is moved by a preloaded ball screw coupled to a stepper motor by a toothed belt. A unique feature of the present system is that the drill advances into the workpiece at a rate exactly proportional to the drill rotational speed. In accordance with the present system, the coupling between the drill rotary and linear movement is done through the present open loop control system. In testing the current system demonstrated drilling of aircraft quality fastener holes at rates better than twenty times faster than any commercially available positive feed drilling system.

DESCRIPTION OF THE PREFERRED EMBODIMENTS

The preferred embodiment of the present invention will be described with reference to the drawings.

Figure 1:
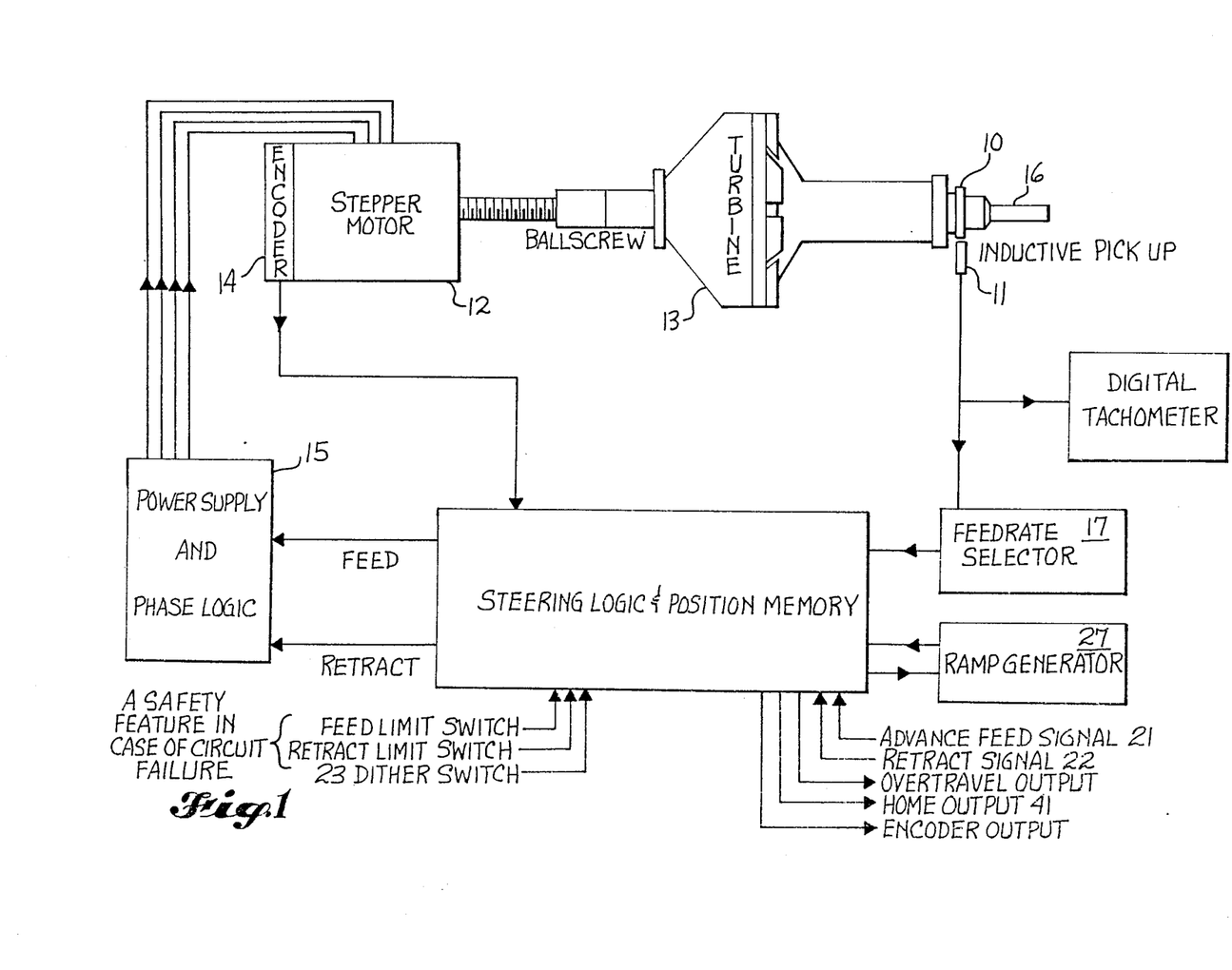
FIG. 1 is a block diagram of the present high speed positive feed drill motor feedback servo control system.

Referring to FIG. 1 it will be seen that a stepper motor 12 is utilized to drive turbine drill motor 13 and spindle carriage to provide a constant inches per drill revolution feed rate. Stepper motor drive pulses are obtained from magnetic pickup 11 mounted on the carriage and a 60-tooth gear 10 located on the drill spindle 16. The drive pulses are fed to a variable frequency divider 17 which is controlled with thumbwheel switches (see FIG. 4A) located on the front panel of control cabient (not shown). The drill feed rate is determined by selecting the stepper drive pulse rate with the thumbwheel switches. The pulses are routed through steering logic circuitry to the stepper power controller 15 to drive the motor 12 (see also FIGS. 2 and 3).

The drilling cycle sequence is initiated by a pulse 21 from the host computer 18. While a host computer is utilized in the illustrated embodiment, the start/stop pulses could be provided through utilization simply of switches connected to a DC voltage source. A linear ramped frequency pulse train 19 (see also FIG. 2) is fed to the stepper 12 until the frequency matches the divided spindle pickup frequency 20, at which time the divided spindle pulses are fed to the stepper 12. The stepper tracks the spindle speed profile until a second pulse is received from the host computer (18 of FIG. 2). The second pulse 22 initiates the remaining portion of the cycle in which the stepper ramps down, reverses direction, ramps up, tracks the spindle speed, ramps down, and parks the spindle carriage in its starting position.

L.E.D. indicators are provided on the front panel of the control cabinet (not shown) to indicate the status of the stepper control circuitry. They are as follows:
1. Home—"on" when the stepper has parked the carriage in the starting position.
2. Lock—"off" if the stepper has not been able to track, or maintain lock with, the pulses supplied to it during the ramp up or run portions of the cycle.
3. Ramp—"on" when the stepper is at rest or ramping.
4. Run—"on" when the stepper is tracking the spingle speed in either the forward or reverse direction.
5. ADV—"on" when the stepper is turning clockwise (spindle extending).
6. RET—"on" when the stepper is turning counter-clockwise (spindle retracting).

The control circuit is entirely self-contained, requiring only two pulses from an external source 18 (see FIG. 2) and an external parking switch 23 located on the spindle carriage support to complete the cycle.

Figure 2:
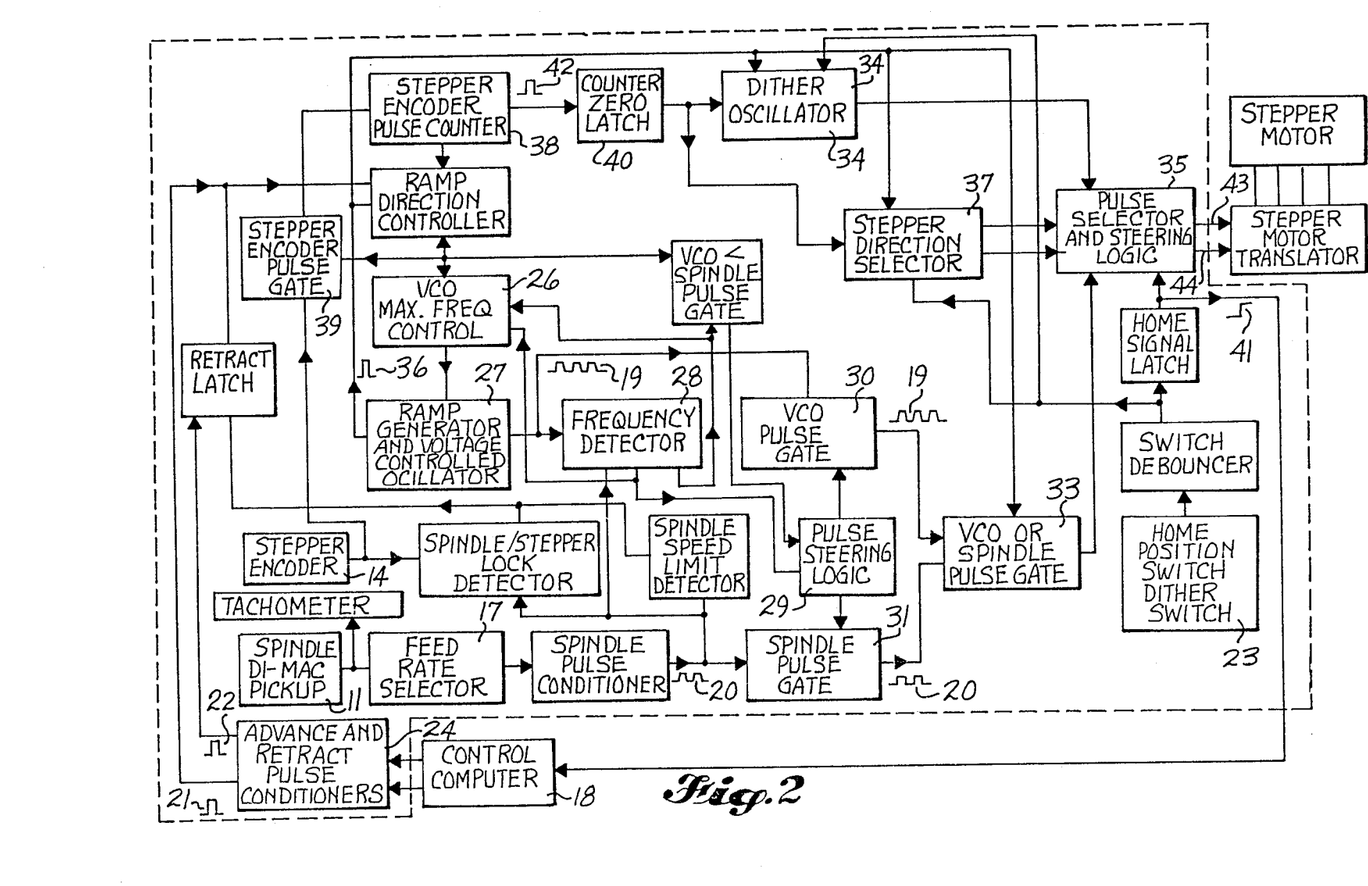
FIG. 2 is a more detailed block diagram showing the several circuits utilized in the present high speed positive feed drill motor feedback control system shown in FIG. 1.
Figure 3:
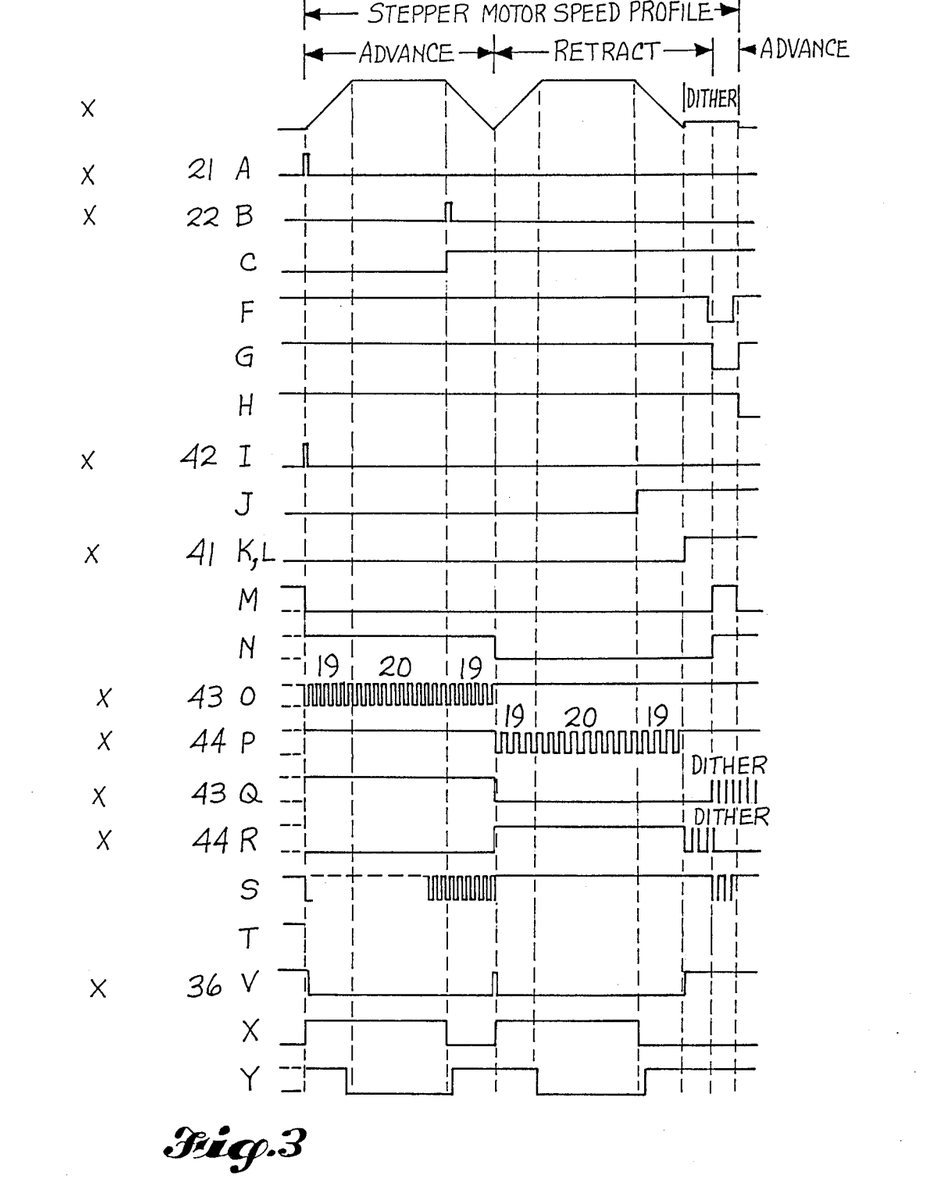
FIG. 3 is a pulse waveform diagram showing the time relationships between the pulses shown in the detailed block diagram of FIG. 2.

Turning now to a system understanding first by explanation of the pulse diagram timing shown in FIG. 3 and imprinted on the control system of FIG. 2, it can first be seen that two pulses are supplied to the feed rate controller by the host computer 18. One pulse 21 resets portions of the circuit and starts the advance portion of the cycle. The other pulse 22 initiates the retract portion of the cycle. The pulses are conditioned by monostable multivibrators 24.

Advance pulse 21 sets ramp direction flip-flop 25 which is gated to ramp generator 27 by way of the voltage controlled oscillator maximum frequency control 26. The output of the voltage controlled oscillator (VCO) utilized in ramp generator 27 increases in frequency linearly from about five hertz until its pulse rate 19 equals that of the selected feed pulse rate 20. At this time, the frequency detector 28 holds the VCO pulse rate 19 close to the feed pulse rate 20 by way of control circuit 26. This is accomplished by rapidly alternating the ramp direction.

Frequency detector 28 also controls steering flip-flop 29 which gates either the VCO pulses 19 or the feed rate pulses 20 to the stepper motor 12. The gating is done through gates 30 and 31. Gate 32 prevents the steering flip-flop 29 from changing state while frequency detector 28 is alternating the ramp direction.

When the control computer determines that the spindle 16 has advanced the required distance, a retract pulse 22 is fed to the feed rate controller. This pulse changes the state of flip-flop 25 which initiates the VCO 27 ramp down. When ramp down is complete, pulse 36 changes the state of 25 and stepper 12 direction flip-flop 37, which causes ramp up of the VCO 27 and the spindle 16 to move toward its starting position. At this time, pulse 36 is of short duration and does not affect gate 33.

Stepper motor encoder 14 pulses are fed to counter 38 during the ramp up and advance run portion of the cycle. The pulses are cut off during ramp down at gate 39. The counter 38 counts up during advance and counts down during retract. When the counter 38 reaches zero count, a pulse 42 sets latch 40 and starts the final VCO 27 ramp down. At the end of ramp down pulses from the dither oscillator 34, having been enabled by latch 40, are fed to the stepper 12. Dither oscillator pulses are low frequency pulses which are used to park the spindle in the correct starting position.

A description of the drill cycle for drilling a fastener hole through an exemplary two inch thick piece of material is given below. Times referred to are the actual performance times from the start of the drilling cycle achieved in tests. Reference to FIG. 1 may be made while reading the following drill cycle description.

TIME .000 TO .090 SECONDS (ACCELERATING DRILL TOWARD WORKPIECE)
DRILL SPINDLE IS TURNING AT 35,000 RPM
A FEED SIGNAL IS RECEIVED
STEERING LOGIC SWITCHES FROM REST TO RAMP GENERATOR (RAMP UP)
STEPPER MOTOR ACCELERATES BALL SCREW UNDER RAMP GENERATOR CONTROL
TURBINE MOTOR AND DRILL BIT ARE ADVANCING TOWARD WORKPIECE
ENCODER IS TELLING AXIAL POSITION TO POSITION MEMORY AND EXTERNAL CONTROL
HOST COMPUTER
TIME .090 TO .432 SECONDS (DRILLING THE HOLE)
STEPPER MOTOR SPEED AND SPINDLE SPEED HIT SYNCHRONOUS POINT
STEERING LOGIC SWITCHES STEPPER MOTOR CONTROL FROM RAMP GENERATOR TO SPINDLE
DRILLING STARTS AT EXACT FEED RATE (INCHES PER REVOLUTION)
TURBINE MOTOR BEGINS SLOWING DOWN - STEPPER MOTOR FOLLOWS
ENCODER IS TELLING AXIAL POSITION AND VERIFYING SYNCHRONISM
DRILLING IS COMPLETED AT EXACT FEED RATE
TURBINE AT MINIMUM SPEED
TWO INCHES OF MATERIAL HAVE BEEN DRILLED
TIME .432 TO .532 SECONDS (DRILL AXIAL MOVEMENT BEING REVERSED)
A RETRACT SIGNAL IS RECEIVED
STEERING LOGIC SWITCHES STEPPER CONTROL FROM SPINDLE TO RAMP GENERATOR (RAMP DOWN)
STEPPER DECELERATES BALL SCREW TO ZERO SPEED UNDER RAMP GENERATOR CONTROL
AT ZERO BALL SCREW SPEED, RAMP DOWN IS SWITCHED TO RAMP UP IN REVERSE
STEPPER ACCELERATES BALL SCREW UNDER RAMP GENERATOR CONTROL (REVERSE)
ENCODER IS TELLING POSITION AND VERIFYING SYNCHRONISM
TIME .532 to 1.032 SECONDS (DRILL BEING RETRACTED FROM HOLE)
TURBINE MOTOR IS ACCELERATING
STEPPER SPEED AND SPINDLE SPEED HIT SYNCHRONOUS POINT
STEERING LOGIC SWITCHES STEPPER MOTOR CONTROL FROM RAMP GENERATOR TO SPINDLE
RETRACT PROCEEDS AT SAME EXACT FEED RATE (INCHES PER REVOLUTION) AS DRILLING
ENCODER IS TELLING POSITION AND VERIFYING SYNCHRONISM
RETRACT FINISHES AT EXACT INCHES PER REVOLUTION
HOME SIGNAL IS OUTPUT AS THE DRILL CLEARS THE HOLE
TIME 1.032 TO 1.082 SECONDS (DRILL AXIAL MOVEMENT SLOWING TO A STOP)
STEERING LOGIC SWITCHES FROM SPINDLE TO RAMP GENERATOR (RAMP DOWN)
STEPPER MOTOR DECELERATES BALL SCREW UNDER RAMP GENERATOR CONTROL (PAST START POINT)
DITHER SWITCH ENGAGED BY FEED CARRIAGE
AT ZERO BALL SCREW SPEED, STEERING LOGIC SWITCHES FROM RAMP GENERATOR TO DITHER OSCILLATOR
TIME 1.082 TO 1.182 SECONDS (DRILL BEING REPOSITIONED FOR NEXT HOLE)
DITHER OSCILLATOR DRIVES STEPPER MOTOR FORWARD
DITHER SWITCH CLEARS CARRIAGE
STEPPER IS SHUT OFF
CONTROL RESETS AND WAITS FOR NEXT

-continued

FEED SIGNAL

Figure 4A:
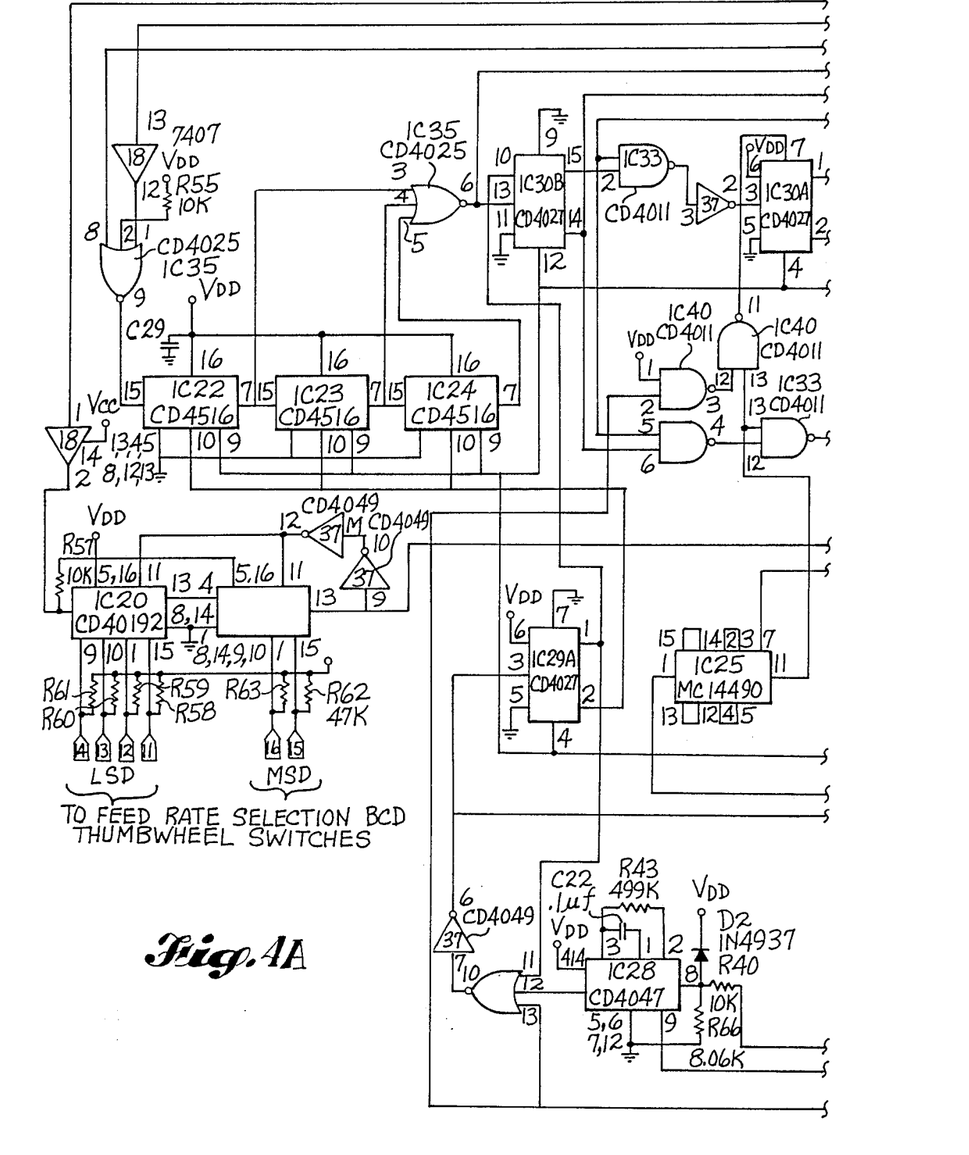
FIGS. 4A and 4B when taken together show in detail the control logic circuits utilized in the system of FIG. 2.
Figure 4B:
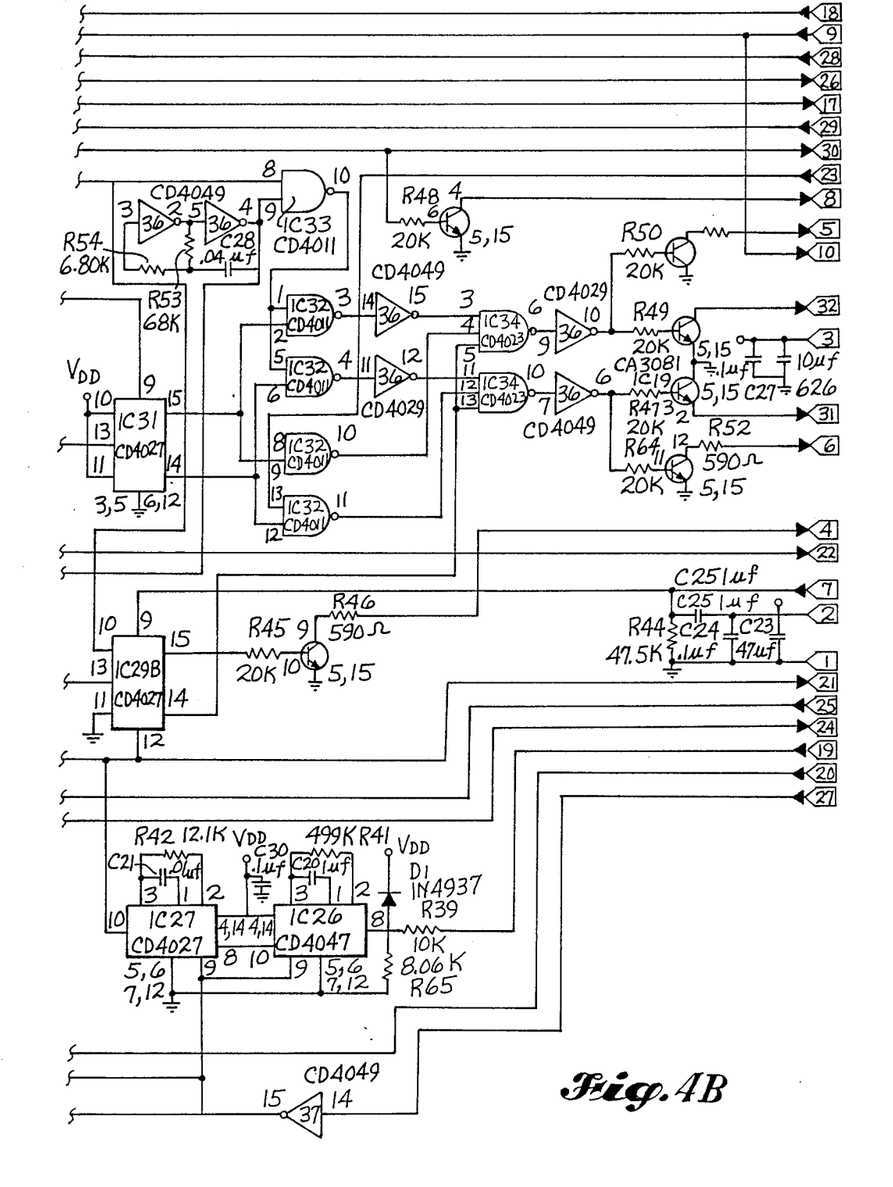
Figure 4C:
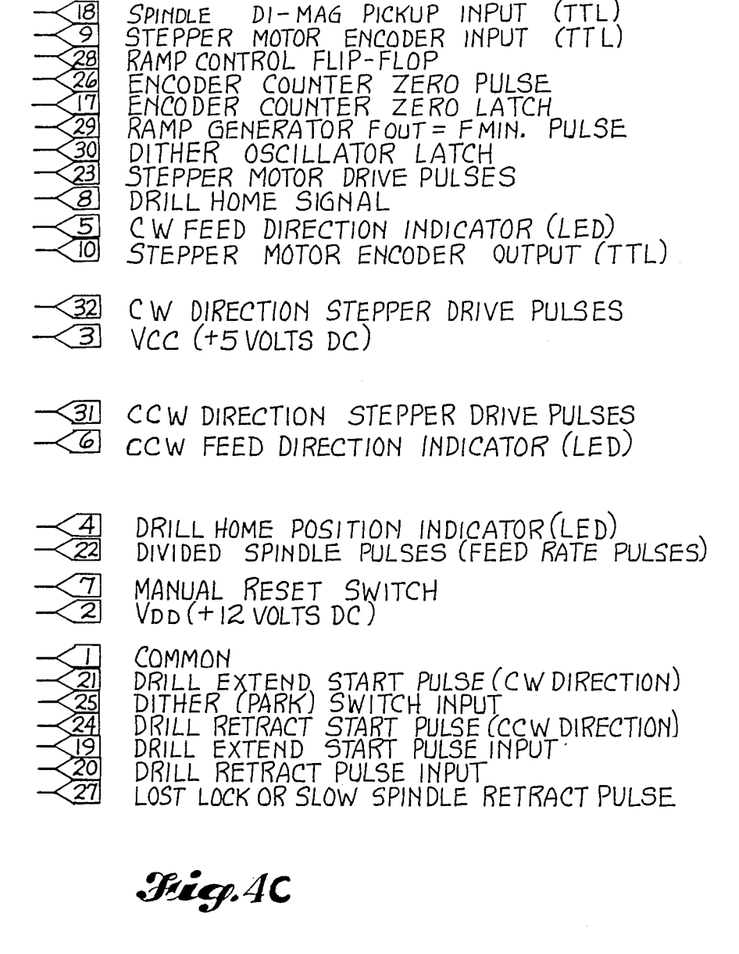
FIG. 4C shows the nomenclature for the signals present on the terminals numbered on the right side of the control logic circuits shown in FIG. 4B.

Two control pulses from the host computer (or other external source) are fed into pins 19 and 20 of the control logic circuit of FIGS. 4A, B, and C. The pulse into pin 19 will be referred to hereafter as the extend pulse (previously referred to as advance pulse) and the pulse into pin 20 will be referred to as the "retract pulse". These pulses can be any level from approximately 18 to 50 volts with a nominal 24 volts. Pulse duration is not critical and can be anything from one microsecond to one second. The pulses are conditioned by the CD4047 monostable multivibrators IC26, 27, and 28. The inputs to IC26 and IC28 are protected by voltage dividers and fast recovery IN4937 diodes. All three monostables are connected in the nonretriggerable mode and retriggered on the rising edge of their respective input pulses.

An extend pulse to pin 19 of the logic circuit of FIGS. 4A, B, and C triggers IC26, which in turn triggers IC27. IC26 output pulse duration is approximately 1.25 seconds and is set to this length to block out any other pulse which might be applied to the extend pulse input before the drilling cycle is complete. IC27 output pulse duration is 300 microseconds and is used to initialize portions of the circuit and start the circuit sequence.

A retract pulse to pin 20 of the logic circuit triggers IC28 which has an output pulse duration of 125 milliseconds. The output pulse triggers JK flip-flop, IC29A, which latches the retract signal line to prevent any further pulses on this line from affecting the circuit operation. The retract line is also activated and latched if the stepper and spindle lose lock or if the spindle speed drops below 1000 rpm. Pin 27 of the boards goes low and stays low if either of these events occur. This signal not only activates the retract line but also disables the extend and retract pulse monostables, IC26, IC27, and IC28, and sets the dither oscillator latch IC30A. (The dither oscillator will be described later). The monostables are disabled by holding their reset inputs, pin 9, high. If lock is lost or the spindle speed drops below 1000 rpm the spindle carriage will return to its home position, driven by the dither oscillator pulses. The circuit will remain disabled until the manual reset switch on the front panel of the control cabinet (not shown) is activated.

Figure 5A:
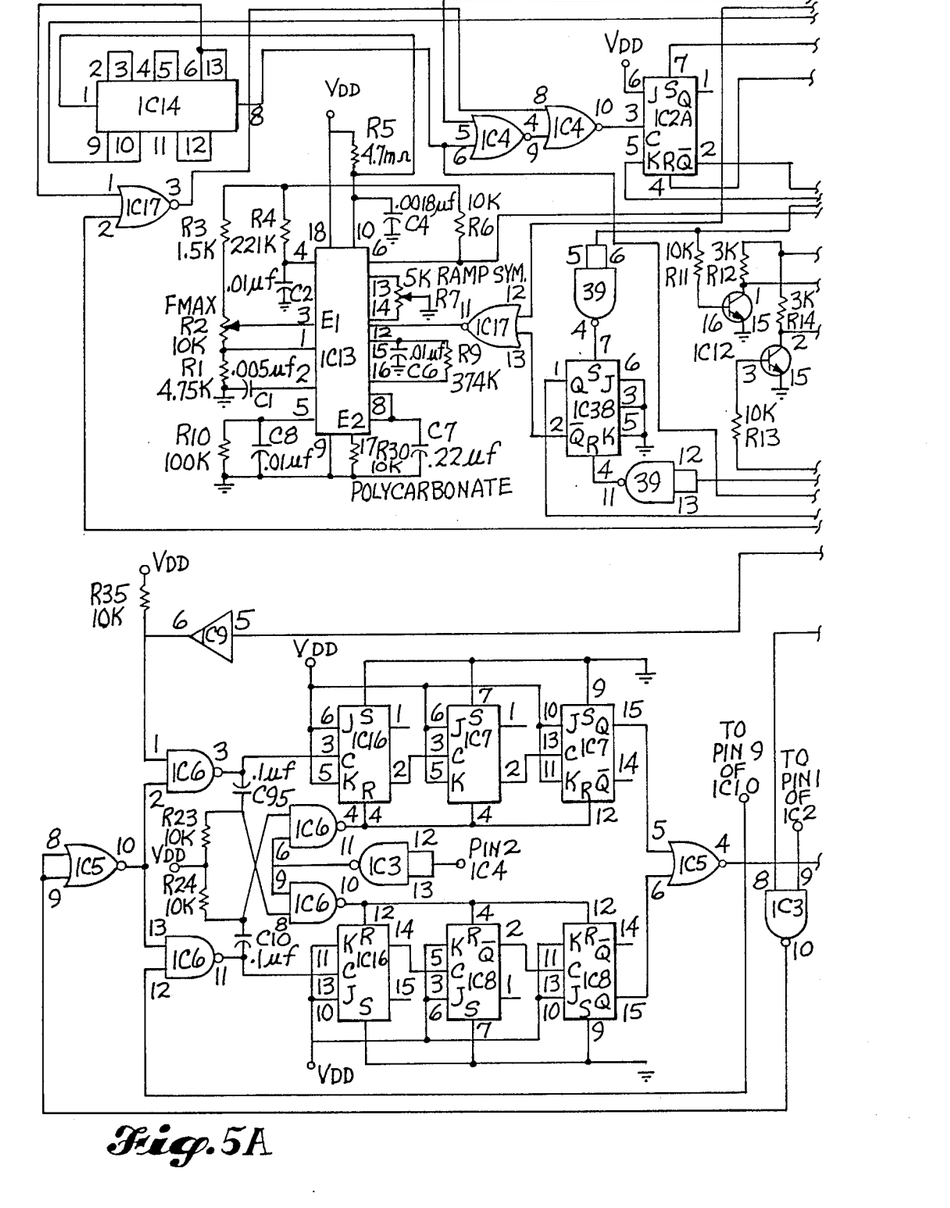
FIGS. 5A and 5B when connected together show the ramp/freak period detector circuits utilized in the control system of FIG. 2.
Figure 5B:
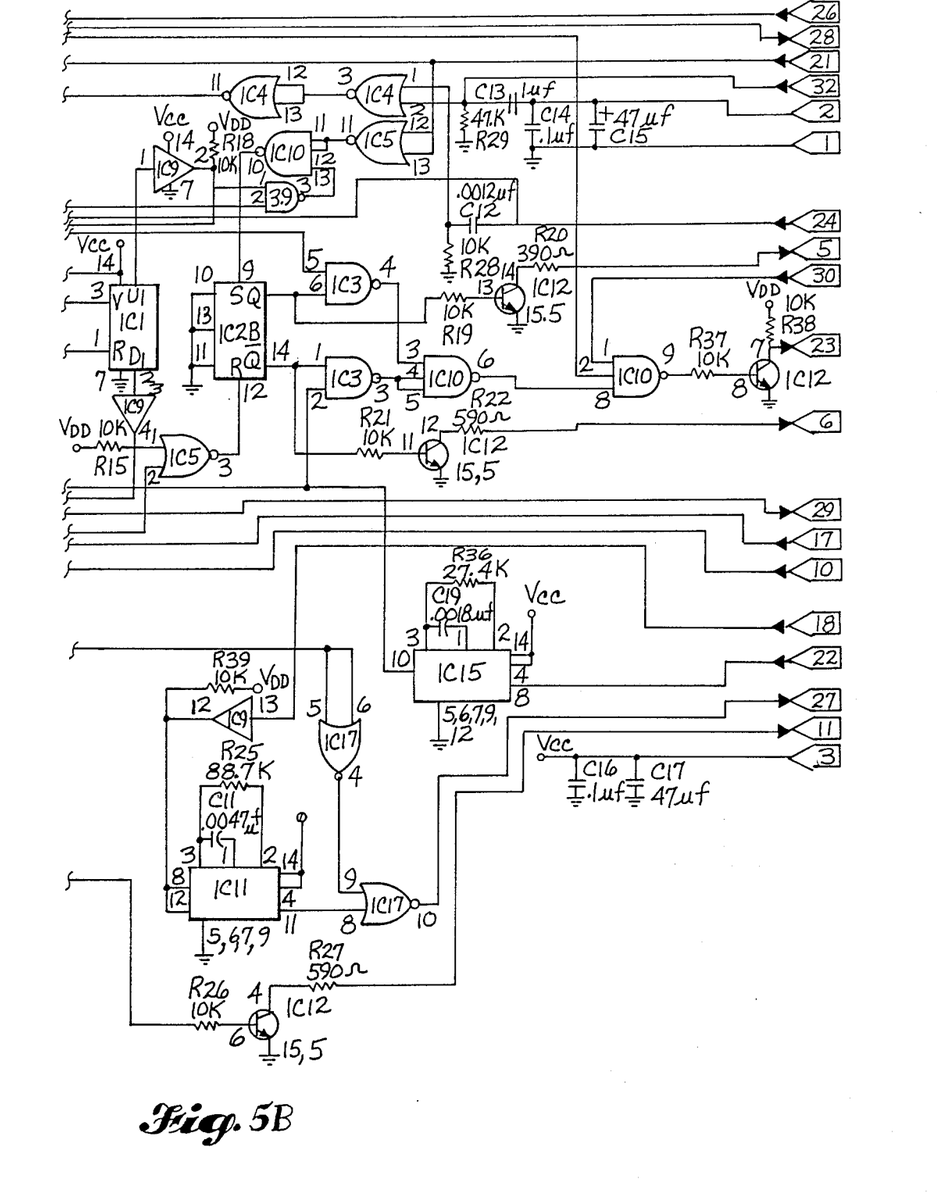
Figure 5C:
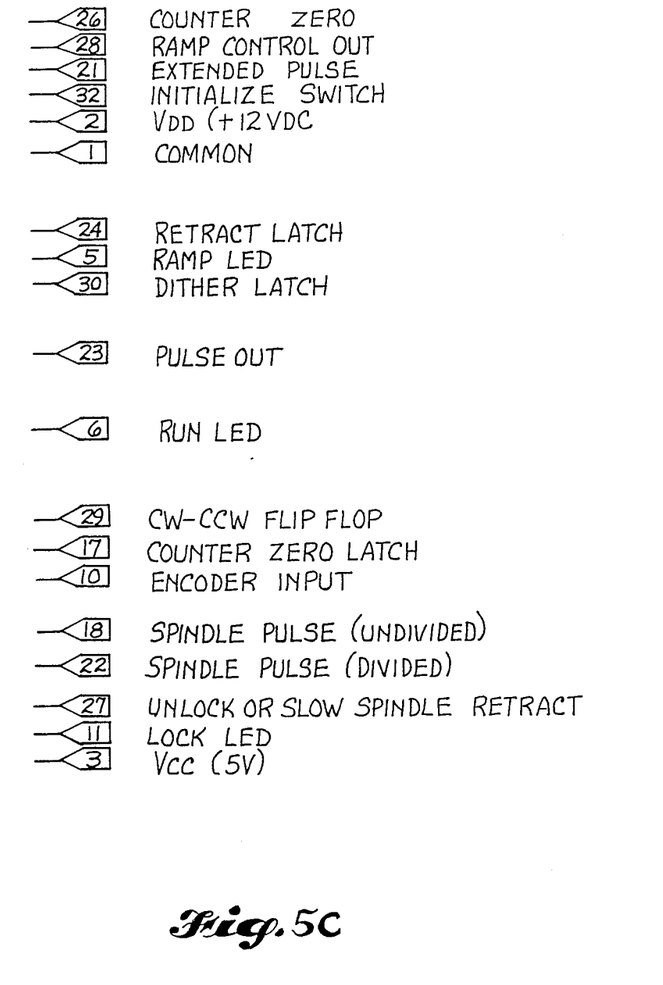
FIG. 5C shows the signals present at the terminals on the right hand side of the control circuit of FIG. 5B.

The lock loss and slow spindle detection circuits are located on the ramp/frequency detector board of FIGS. 5A, B, and C. Undivided spindle pickup pulses enter the detector circuits through pin 18. The TTL level pulses are stepped up to 12 volts by one section of IC9 and routed to IC11 which is connected as a retriggerable monostable. Pulse duration for the monostable is one millisecond; therefore, once triggered, the output of IC11 will remain unchanged unless the time between the positive going edges of the spindle pulses exceeds one millisecond.

Lock loss is detected by feeding the stepper motor encoder pulses and the stepper drive pulses into separate counters, each of which is reset by each pulse which is feeding the other counter. If four pulses arrive at one counter before two pulses arrive at the other counter, the output of the detector will change state. The detector is gated on and off by the ramp control flip-flop IC2A so that the detector is active only on the ramp up and run positions of the cycle. IC7, 8, 16, 6 and two sections each of IC3 and IC5 make up the detector circuit. The circuit is symmetrical and self-latching so, once tripped, it can only be reset by activating the manual reset switch. The encoder pulses are TTL level and are converted to a 12-volt level by a section of IC9. Quadrature pulses are available from the encoder; however, only one channel is used. This channel is routed to pin 10 of the board.

The outputs of the lock detector and the slow spindle detector are or'ed by a section of IC17. If the output of either detector changes state, pin 27 of the board goes low.

Spindle rpm pulses are generated by a digital magnetic pickup (11 of FIG. 1) mounted on the spindle carriage. The pickup is activated by a 60-tooth gear (10 of FIG. 1) built into the spindle. The pickup puts out TTL level pulses, which are routed to pin 18 of both circuits of FIGS. 4A, B, C and FIGS. 5A, B, and C. On the control logic board, the TTL level signal is converted to a 12-volt signal by a section of IC18 and then fed to a frequency divider consisting of IC20, 21, and two section of IC37. The divider is wired to divide by 1 through 39 as selected by the two thumbwheel switches. Output pulses from the divider are very narrow and are fed through pin 22 of the boards to IC15 on the ramp/frequency detector circuit of FIGS. 5A, B, and C, a monostable with an output pulse width of 122 microseconds.

The divided spindle pulses output from IC15 are routed to one section of IC3 to be gated to the stepper motor during the run portion of the cycle and also routed to the frequency detector, IC1, by way of one section of IC12. IC12 is a seven-transistor array with this section used as a level shifter to convert the 12-volt-level pulse to TTL level required by the MC4044 (not to be confused with the CMOS 4000 series) frequency detector.

The spindle pulses are applied to the reference frequency input of the frequency detector while pulses from the ramp generator oscillator are applied to the variable input. If the spindle frequency is higher than the ramp oscillator frequency, the MC4044 D1 output remains high while pulses appear at the U1 output. The U1 pulses are routed to the set input of steering flip-flop IC2B which enables the gate through which the ramp oscillator pulses must pass, to drive the stepper motor. When the ramp oscillator ramps up, the frequency to the variable input exceeds the spindle frequency at which instant the U1 output remains high and pulses appear at the D1 output. The D1 pulses are routed to the reset input of steering flip-flop IC2B, which enables the gate through which the spindle pulses must pass, to drive the stepper motor.

After ramp up has begun, the U1 pulses to the steering flip-flop, IC2B, are gated off at pin 2 of IC39 by the ramp control flip-flop IC2A. To insure that the steering flip-flop does not change state prematurely, the D1 output of the MC4044 is gated off by IC38 at pin 2 of IC5. At the end of ramp up, IC38 changes state and the D1 pulses reset the steering flip-flop, which in turn enables the gate which passes the spindle and disables the gate which passes the ramp pulses.

The ramp generator and oscillator, IC13, is a Sigma Corp RCO chip. Pin 12 is the ramp control input. A high level on this pin causes the circuit to ramp up and a low level causes ramp down. Pin 12 is fed by NOR gate IC17 which is connected to the ramp control flip-flop IC2A and to IC38. The state of IC38 is always under control of IC1 outputs D1 and U1. Therefore, the output of IC38 connected to IC17 is always low when IC13 is in the ramped down state, which puts the ramp control input to IC13 under control of IC2A. When IC2A changes state, IC13 ramps up until its output frequency exceeds the spindle frequency at which time IC38 changes state and causes IC13 to start ramping down. As soon as the ramp frequency goes below the spindle frequency, IC38 changes state again and causes IC13 to ramp up. So, by causing the ramp frequency to oscillate up and down rapidly, the ramp oscillator frequency is held very close to the spindle frequency. If the ramp frequency were not controlled, it would always go to some maximum frequency, which could be much higher than the spindle frequency and the problem would be that the stepper motor would not start ramp down at the instant the ramp down signal was applied and the spindle carriage could overtravel.

The ramp time of the Sigma Corp RCO chip is determined by the resistor connected to pins 15 and 16 and the capacitor connected between pins 8 and 11 and ground The maximum frequency to which the oscillator would ramp if pin 12 was held high continuously is determined by the voltage applied to pin 3. The voltage at pin 3 is adjusted with trimpot R2. The maximum frequency could be set to a specific point by adjusting the voltage to pin 3 and selecting the timing resistor (variable) and capacitor to provide the desired ramp time for that frequency and capacitor to provide the desired ramp time for that frequency. Or, as is done here, the maximum frequency can be set at the highest frequency that will be required by the stepper motor and the timing resistor and capacitor selected to give a ramp time slightly longer than desired. The ramp time can then be adjusted by varying the voltage at pin 3. For example, if the maximum frequency desired is 5000 Hz at a 90 millisecond ramp time, the ramp time could be set at 100 milliseconds with fixed value timing component. The voltage of pin 3 could then be increased to increase the frequency to which the RCO must ramp in 100 milliseconds which, of course, will decrease the ramp time to 5000 Hz. The variable resistor connected to pins 13 and 14 is used to adjust the ramp up and ramp down symmetry. Ramp times are affected by the symmetry adjustment; therefore, this adjustment should be made before final ramp time adjustments.

Notification that the RCO has completed ramp down is required by the circuit to toggle both the stepper direction steering flip-flop IC31, and the ramp control flip-flop IC2A at the end of the spindle extend (advance) portion of the cycle. This signal is obtained from pin 10 of the RCO chip. The voltage at pin 10 does not rise sharply and also contains some negative going spikes as the RCO output frequency approaches minimum. Some filtering is utilized to clean up the signal and it is fed to a schmitt trigger input buffer, IC14. The signal line to the ramp control flip-flop IC2A is connected to allow the flip-flop to trigger at the end of the first ramp down but not at the end of the second ramp down. After the second ramp down, the RCO will remain in the ramped-down state until the next cycle is initiated by an extend (advance) pulse. The RCO output pulses are available at pin 6. These pulses are fed to the frequency detector, IC1, after a level shift by one section of IC12, and to steering logic to be routed to the stepper motor during the ramp portions of the cycle.

Stepper motor encoder pulses are fed to the control logic circuit at FIGS. 4A, B, and C through pin 9. The pulses are level shifted from TTL to 12 volts by IC18 and routed to a pulse counter by way of NOR gate IC35. The gate cuts off the encoder pulses during the ramp down portions of the cycle. The function of the counter, consisting of IC22, 23, and 24, is to provide the pulses which starts the final ramp down. Encoder pulses are counted up during the ramp up and extend portions of the cycle and counted down during the ramp up and retract portions of the cycle. When the counter counts down to zero, it is decoded by a gate in IC35 which triggers the counter latch IC30B and ramp control flip-flop IC2A which starts the final ramp down.

The counter latch performs three functions. First, it is fed through control logic circuit pin 17 to a section of gate IC17 on the ramp/frequency detector circuit of FIGS. 5A, B, and C to prevent the toggle of ramp control flip-flop IC2A when ramp down is complete. Second, it prevents the toggle of motor direction flip-flop IC31 by gating off the minimum frequency signal from the RCO chip. Third, it enables the gate feeding the dither oscillator latch IC30A so that the minimum frequency signal from the RCO will toggle the latch at the end of the ramp down.

The state of the dither latch will also be changed if a lock loss or slow spindle signal occurs. This signal is routed to the latch set input and will cause the stepper to return the spindle carriage to home position should the lock loss or slow spindle signal occur any time during the cycle. The motor will be driven by the dither oscillator pulses.

Four functions are performed by the dither latch: first, it is fed through circuit pin 30 to IC10 on the ramp/frequency detector circuit of FIGS. 5A, B, and C to gate off all spindle or ramp pulses; second, it enables the dither oscillator; third, it enables the home position latch IC29B; and fourth, the latch drives an open collector transistor which is used to inform the host computer that the cycle is finished. The transistor collector is tied to pin 8 of the board. Notice that the computer is notified at the beginning of the parking dither to save cycle time.

The dither oscillator (34 of FIG. 2) is made with two inverter sections of IC36. The frequency of oscillation is approximately 400 Hz. Pulses from the dither oscillator are normally fed to the stepper motor to park the spindle carriage after the return ramp down. The pulses are also fed continuously to the parking switch debouncer, IC25, clock input.

A normally open single pole single throw switch is mounted on the carriage support and is activated by the spindle carriage at the end of the retract stroke. The switch is connected to the input of IC25, a hex contact bounce eliminator type MC14490. When the parking switch is activated, the input of IC25 is pulled low. Four clock pulses after the final switch contact bounce, the output of the first section of IC25 goes low. Five sections of IC25 are connected in series so the final output goes low 20 clock pulses after the parking switch is activated. Since the same clock pulses are at this time being applied to the stepper motor, the carriage continues in the same direction for 20 motor steps after activating the parking switch.

The switch debouncer output is tied to the dither latch IC30A, the stepper direction steering flip-flop IC31, and the home position latch, IC29B. When the debouncer output goes low the dither latch is set if it is not already set. This is a precautionary measure to turn on the dither oscillator should the carriage, for some reason, hit the parking switch during or before ramp down. The low output also toggles the direction flip-flop to reverse the carriage direction. The parking switch will affect the direction flip-flop only after the counter zero latch, IC30B, has been set to insure proper circuit sequence.

After the direction flip-flop has toggled, the carriage moves off the parking switch 20 motor steps, at which time the debouncer output goes high. The low to high transition of the debouncer triggers the home position latch IC29B, which gates off all pulses to the stepper motor, and the cycle is complete. The next cycle is initiated by the application of an extend (advance) pulse to pin 19 of the control logic circuit of FIGS. 4A, B, and C.

The initial cycle must be started with the parking switch open. If an extended pulse is applied when the switch is closed, the carriage will move to the point where the switch opens, the position latch IC29B will be triggered, and all pulses to the motor will be cut off. A manual reset will then be required.

Two separate outputs are employed to route pulses to the stepper power controller, a CW (advance) output and a CCW (retract) output. The outputs are open collector transistors, IC19, to allow a level shift from 12 volts to the TTL level required by the power controller. Also, the output is wired so that the input to the power controller not being pulsed is held high.

The rise and fall times of the input pulses to the power controller are critical and must be kept less than two microseconds. The pulses from the stepper control circuitry to the power controller are routed through shielded cable and travel limit switches on the spindle carriage support. Capacitance in the cables rounds of the leading edge of the pulses. A circuit using schmitt trigger input buffers (74C914) was designed to square up the pulses.

It should be noted that the spindle carriage moves 0.00125 inches per stepper pulse. So, the carriage moves 0.025 inches into the parking switch after it is activated (closed) and 0.025 inches off the switch when it is deactivated (opened).

What is claimed is:

1. In combination:
    a stepper motor for driving a spindle carriage supporting a turbine drill motor and advancing a drill into a workpiece at a feed rate proportional to the rotational speed of the drill;
    means for providing stepper motor drive pulses;
    a thumbwheel switch controlled variable frequency divider for selecting a predetermined feed rate;
    said thumbwheel switch controlled variable frequency divider responsive to said stepper motor drive pulses;
    steering logic control circuitry; and
    a stepper power controller responsive to said steering logic circuitry for driving said stepper motor.

2. Apparatus for drilling through a workpiece, said apparatus having a drill cycle providing storage of mechanical energy in a rotating spindle system comprising in combination:
    an air turbine motor;
    a positive feed stepper motor controlled open loop drill control system;
    a ramp generator
    an inductive pick-up means for maintaining the feed in said positive feed stepper for motor controlled open loop drill control stationary and, thereupon causing said ramp generator to deliver at linear increasing frequency a pulse train to the stepper motor thereby accelerating said stepper motor to about ten times the stepper motor base speed;

said spindle system providing a pulse train by means of said inductive pick-up;

means for switching from the ramp generator pulse train to the pulse train from said spindle system when the frequency of the pulse train from the ramp generator is equal to the frequency of the pulse train from said spindle system; and means for applying the pulse train from said spindle system to said stepper motor thereby placing the stepper motor under control of said spindle system to achieve positive feed.

* * * * *